Figure 1:
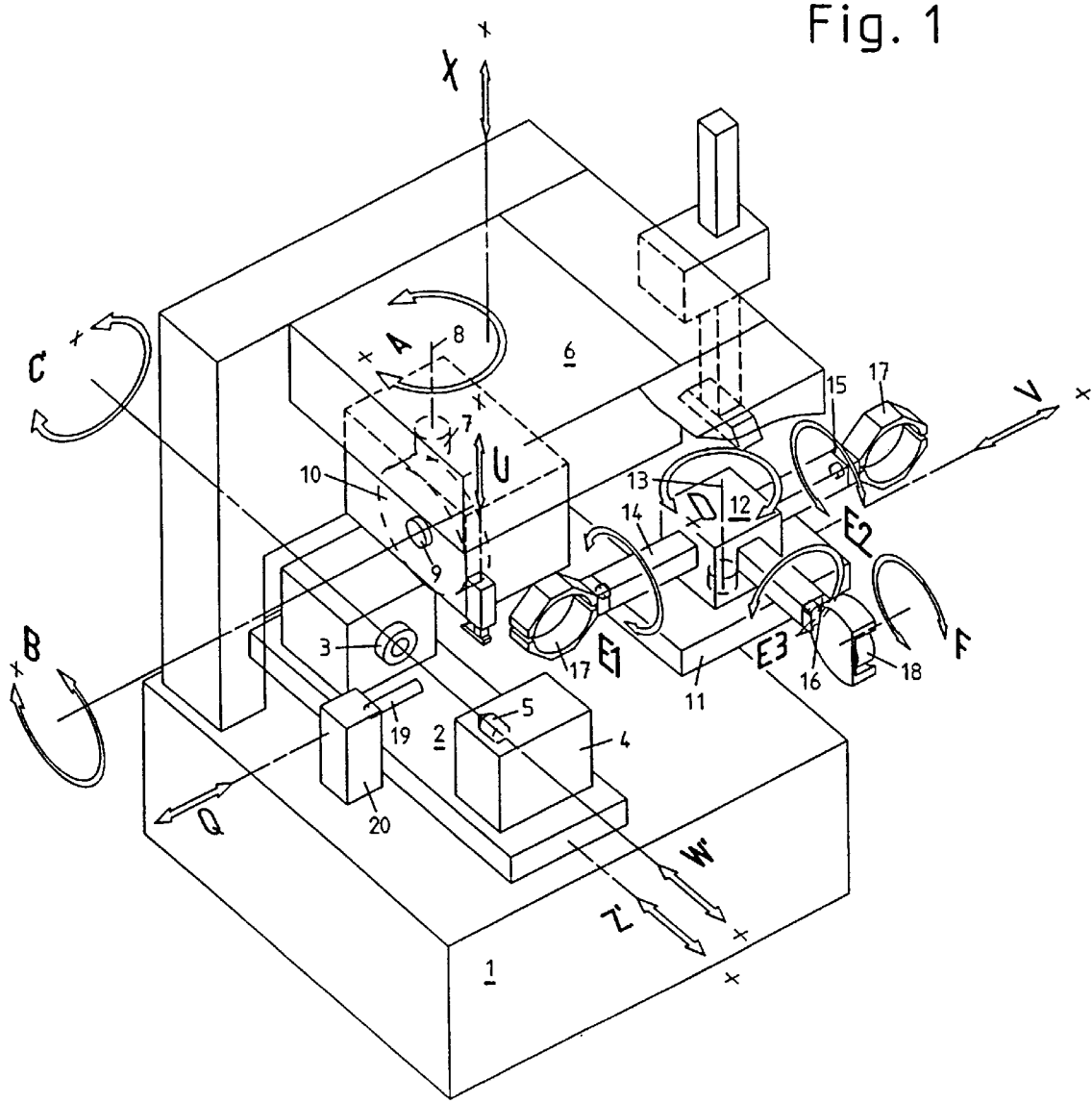

United States Patent [19]
Stollberg

[11] Patent Number: 5,857,896
[45] Date of Patent: Jan. 12, 1999

[54] METHOD AND DEVICE FOR THE FINE MACHINING OF SPUR OR HELICAL GEAR WHEELS

[75] Inventor: Horst Stollberg, Lauchringen, Germany

[73] Assignee: Reishauer AG, Wallisellen, Switzerland

[21] Appl. No.: 872,132

[22] Filed: Jun. 10, 1997

[30] Foreign Application Priority Data

Jun. 26, 1996 [DE] Germany .................. 196 25 520.1

[51] Int. Cl.⁶ ........................................ B24B 1/00
[52] U.S. Cl. ................... 451/47; 451/21; 451/56
[58] Field of Search ................ 451/47, 5, 8, 9, 451/10, 11, 56, 215, 219, 220, 253, 900, 21, 64, 72, 121, 364, 541, 547

[56] References Cited

U.S. PATENT DOCUMENTS

| | | | |
|---|---|---|---|
| 3,772,829 | 11/1973 | Asano et al. | 451/72 |
| 4,122,635 | 10/1978 | Asano et al. | 451/72 |
| 4,151,684 | 5/1979 | Wada et al. | 451/72 |
| 4,559,744 | 12/1985 | Wirz | 451/253 |
| 4,570,386 | 2/1986 | Unno et al. | 451/72 |
| 4,635,404 | 1/1987 | Wirz | 451/253 |
| 4,683,679 | 8/1987 | Salmon | 451/72 |
| 4,760,668 | 8/1988 | Schlaefli | 451/72 |
| 4,897,964 | 2/1990 | Vetter | 451/72 |
| 4,961,289 | 10/1990 | Sulzer | 451/253 |
| 5,076,020 | 12/1991 | Negri | 451/72 |
| 5,183,026 | 2/1993 | Ohta et al. | 451/72 |
| 5,573,449 | 11/1996 | MacKowsky | 451/47 |
| 5,591,065 | 1/1997 | Mizuno et al. | 451/47 |

FOREIGN PATENT DOCUMENTS 37 07 664 C1  3/1987  Germany .

*Primary Examiner*—Timothy V. Eley
*Assistant Examiner*—Derris H. Banks
*Attorney, Agent, or Firm*—Sughrue, Mion, Zinn, Macpeak & Seas, PLLC

[57] ABSTRACT

The device has a work-piece spindle (3) that can be shifted parallel to the spindle axis (C'). On it, in addition to the work-piece toothed wheel, at least one toothed dressing wheel is mounted on which the globoid grinding worm (10) is periodically dressed. On a tool-changer (12), a toothed honing wheel (18) is lodged rotatably on an additional arm (16); with it, the work-piece toothed wheel is honed after grinding. The toothed honing wheel (18) is dressed on the same or a second toothed dressing wheel. The device makes possible an efficient fine machining of toothed wheels.

6 Claims, 2 Drawing Sheets

METHOD AND DEVICE FOR THE FINE MACHINING OF SPUR OR HELICAL GEAR WHEELS

A method and a device according to the introductory clause of claims 1 and 2 are known from DE-PS 3150961. A work-piece spindle axis crosses a tool spindle axis at an angle of less than 90° between the axes. During grinding, the globoid grinding worm engages the entire width of the work-piece toothed wheel at the same time. During grinding, with synchronous rotation of the tool and the work-piece, feeding first goes to the desired axis distance. Then, a positive and subsequently a negative additional rotational movement is superimposed over the synchronous rotational movement of the work-piece. Mounted on the work-piece spindle in addition to the work-piece is a toothed dressing wheel that is identical to the work-piece in shape but is coated with grains of hard material. The grinding worm is periodically dressed by means of this toothed dressing wheel. Since, during grinding according to the above method, the grinding marks run essentially in the direction of the flank because of the large crossing angle of the axes, it is familiar to subsequently hone the toothed wheels ground on the above device on separate honing machines, typically with honing wheels with internal toothing, to improve the noise characteristics.

A continuous generating grinding process is known from DE-PS 37 07 664, in which grinding is carried out with a cylindrical grinding worm. During grinding, the grinding worm is shifted axially and at the same time tangentially and slightly radially to the work-piece. A crowned grinding can be achieved in this way. In addition, a coaxial polishing worm with identical pitch and identical diameter is mounted on the tool spindle. With it, the completely ground workpiece is subsequently polished in the same clamping.

The present invention is based on the technical problem of indicating a method and a device of the type mentioned in the beginning that make possible a more efficient fine machining of gear wheels. This technical problem is solved by the characterizing features of claims 1 and 2.

Below, an example of execution of the invention is explained with the aid of the drawings. They show:

FIG. 1 An perspective view of a device according to the invention, and

Figure 2:
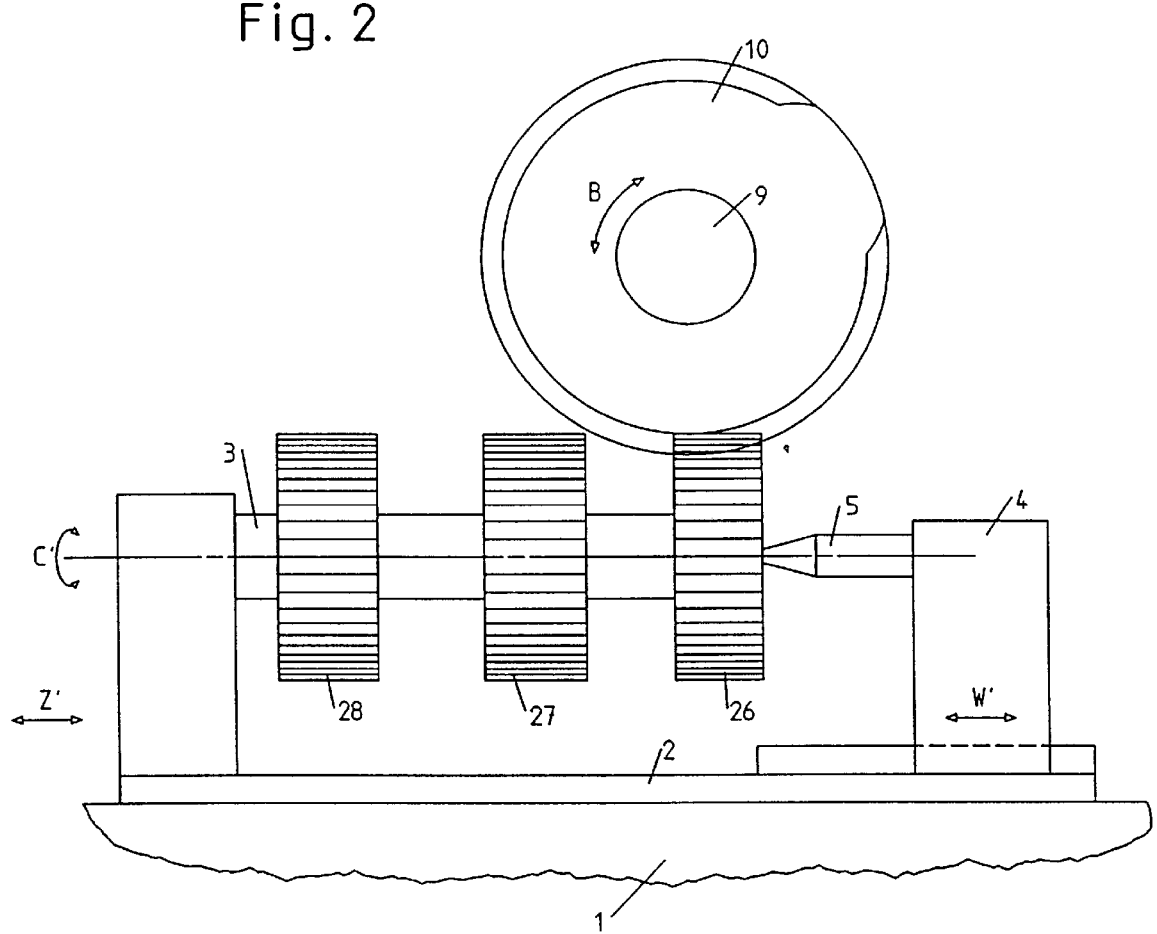

FIG. 2 a side view of the work-piece spindle with mounted work-piece and a grinding wheel.

In FIG. 1, a grinding and honing device is shown in perspective view. Arranged able to be horizontally shifted (axis Z') on a machine foundation 1 is a work-piece slide 2 with a work-piece spindle 3 (axis C') and a tailstock 4 with a tailstock tip 5. The tailstock 4 can be shifted on the slide 2 in the same direction (axis W'). A tool slide 6 can be shifted perpendicular (axis X) to the axis Z', vertically in the illustrated example. On the slide 6, a tool-carrier 7 can be swivelled (axis A) around a swivelling axis 8 parallel to the axis X. The globoid grinding worm 10 is mounted on the grinding spindle 9 (axis B). A work-piece changer slide 11 can be shifted perpendicular (axis V) to the axis Z, horizontally in the illustrated example. It bears a swivelling head 12 that is rotatable around a swivelling axis 13 (axis D) that is perpendicular to the axis V, namely vertical. Three arms 14, 15, 16 protrude from the head 12 radially to the swivelling axis 13; they can be swivelled around their longitudinal axes (axes E1, E2, E3). The arms 14, 15, 16 situated opposite each other bear at their free ends grippers 17 for the replacement of the work-pieces on the spindle 3. A honing wheel 18 is lodged at the free end of the middle arm 16 rotating around an axis (axis F) that is perpendicular to the swivelling axis of the arm 16. The spindle of the honing wheel 18 is connected with a drive motor, which can also be used as brake, to synchronize the honing wheel 18 with the work-piece wheel before feeding-in and to exert on the honing wheel 18 during honing an adjustable torque around the axis F in both directions. The device also has a feeler 19 on a slide 20 that can be fed-in radially to the C' axis (axis Q). By means of this feeler 19, before beginning the radial feed-in of the grinding worm 10, the relative angle of rotation of the work-piece spindle 3 rotating synchronously with the grinding worm 20 is adjusted in such a way that the thread of the grinding worm 10 is in the middle of the tooth spaces of the work-piece or of one of the toothed dressing wheels. All axes C', B, Z', W', X, A, V, D, E1, E2, E3, Q, and F are connected with corresponding drives and controlled by a NC control that is not shown.

FIG. 2 shows a section of the device during the machining of a spur-or helical gear wheel 26. Besides the workpiece 26, two toothed dressing wheels 27, 28 are mounted axially displaced on the work-piece spindle 3. Their flank geometry is identical to the geometry of the flanks of the toothed wheel 26 to be ground. They are coated with grains of hard material, e.g. grains of cubical boron nitride or diamond. The one dressing wheel 28 is used for the roughprofiling (roughing) of the grinding worms, the other dressing wheel 27 for fine profiling (smoothing). To dress the grinding worm, the slide 2 is first shifted into the position in which the grinding worm 10 or the grinding worm slug (a cylindrical grinding wheel) comes into contact with the dressing wheel 28. The grinding worm 10 or the slug is rough-profiled with the dressing wheel 28, in that the slide 6 is first slid in to the desired axis distance and then a small relative rotational movement first in one direction then in the other direction is superimposed over the synchronous rotational movement between the worm 10 and the dressing wheel 28. Then, the Z' position of the slide 2 for the contact of the grinding worm 10 is shifted into the dressing wheel 27 and dressing of the grinding worm 10 is finished. With this design, it is achieved that the smoothing wheel 27 wears much less than with conventional dressing with only one dressing wheel. In this way, dressing precision is substantially increased and wear on the expensive dressing tools, particularly the smoothing wheel 27 decisive for machining precision, is minimized.

The two toothed dressing/profiling wheels 27, 28 may have different cutting characteristics, e.g. differently sized grains of hard material or different materials (e.g. CBN and diamond).

Following the dressing, the slide 2 for the contact of the grinding worm 10 is shifted into the work-piece wheel 26 and its flanks are ground in the manner known according to DE-PS 3150961. The slide 6 is then raised and the head 12 is rotated 90° and the slide 11 is fed-in. The honing wheel 18 has external toothing, unlike conventional honing wheels with internal toothing. During honing, the honing wheel 18 is braked and driven for a predetermined time with an adjustable torque, in order to machine both flanks. Alternatively, the honing wheel may also be used with dual-flank contact, wherein it is freely rotatable during the honing procedure. Because the honing takes place in the same clamping and on the same machine as the grinding, an efficient fine machining is achieved. The honing wheel 18 is also dressed with the same toothed dressing wheels 27, 28 in the same clamping. This makes possible the efficient use of these toothed dressing wheels.

Departing from the described form of execution, the one toothed dressing wheel 27 may also be used exclusively for dressing the grinding worm 10 and the other wheel 28 may be used exclusively for dressing the honing wheel 18. This variant has the advantage that the coating of the wheels 27, 28 can be designed optimally for the given purpose. In this case, the two wheels may also have different tooth geometries, e.g., tooth height and/or tooth thickness, etc. The advantages of both variants may be combined when, in addition to the two wheels 27, 28, a third roughing/dressing wheel is mounted on the work-piece spindle 3.

I claim:

1. Method for the fine machining of a spur or helical gear wheel (26), mounted on a work-piece spindle (3), in a continuous generating grinding process with a globoid grinding worm (10) that machines the gear wheel (26) over an entire width thereof during machining, wherein the grinding worm (10) is fed-in radially relative to the gears wheel (26), wherein coaxially to the gear wheel (26), a first toothed dressing wheel (27) is mounted on the work-piece spindle (3), on which the grinding worm (10) is periodically dressed, wherein after the grinding of the gear wheel (26), the grinding worm (10) is moved out of contact with the gear wheel (26) and in the same mounting, a toothed honing wheel (18) is brought into contact with the gear wheel (26), and wherein the toothed honing wheel (18) is dressed with mounted coaxially on the work-piece spindle (3).

2. Device for the fine machining of a spur or helical gear wheel (26) comprising a work-piece spindle (3), rotatable around a first axis (C'), for mounting a gear wheel (26), with a first drive, and a grinding spindle (9), rotatable around a second axis (B), able to be fed-in radially to the first axis (C') and able to be swivelled around a third axis (A) perpendicular to the first axis (C'), for mounting a grinding worm (10), with a second drive that is synchronized with the first drive, wherein in operation, in addition to the gear wheel (26) a first toothed dressing wheel (27) is mounted coaxially on the work-piece spindle (3), wherein the work-piece spindle (3) can be shifted in the direction of the first axis (C') relative to the grinding worm (10) in two positions in which the grinding worm (10) meshes alternatively with the gear wheel (26) or with the first toothed dressing wheel (27), and wherein an externally toothed honing wheel (18) is arranged rotatable and offset at an angle around the first axis (C') with respect to the grinding spindle (9), the honing wheel (18) being displaceable radially to the first axis (C') and dresssable with the first toothed dressing wheel (17) or with a second toothed dressing wheel (28) mounted coaxially on the work-piece spindle (3).

3. Device according to claim 2, wherein the toothed honing wheel (18) is arranged on an arm (16) of a tool-changer (12) that can be swivelled around a fourth axis (D) on a slide (11) that can be fed-in radially.

4. Device according to claim 3, wherein the arm (16) can be swivelled around a fifth axis (E3) perpendicular to the fourth axis (D).

5. Device according to claim 2, wherein at least two toothed dressing wheels (27, 28) are mounted on the work-piece spindle (3) and the grinding worm (10) and the toothed honing wheel (18) can be alternatively brought into contact with the first or the second toothed dressing wheel (27, 28).

6. Device according to claim 5, wherein the two toothed dressing wheels (27, 28) display different cutting characteristics.

\* \* \* \* \*